United States Patent [19]

Hammerton et al.

[11] Patent Number: 5,393,846
[45] Date of Patent: Feb. 28, 1995

[54] MONOCARBOXYLIC ACID POWDER COATING CURING SYSTEMS

[75] Inventors: David A. Hammerton, Virginia Beach, Va.; Karlheinz Kromberger, Philadelphia, Pa.

[73] Assignee: Rohm and Haas Company, Philadelphia, Pa.

[21] Appl. No.: 118,847

[22] Filed: Sep. 10, 1993

Related U.S. Application Data

[62] Division of Ser. No. 706,816, May 29, 1991, Pat. No. 5,266,657.

[51] Int. Cl.$^6$ ............................................. C08F 8/30
[52] U.S. Cl. .............................. 525/374; 525/329.9; 525/437; 525/448
[58] Field of Search ................ 525/374, 437, 448

[56] References Cited

U.S. PATENT DOCUMENTS 4,727,111  2/1988  Pettit, Jr. et al. ................ 525/190

*Primary Examiner*—Bernard Lipman
*Attorney, Agent, or Firm*—Marvin J. Powell; Sudhir G. Deshmukh

[57] ABSTRACT

A thermosetting powder coating composition having improved optical and weathering properties, such as gloss, orange peel, and Distinctness of Image (DOI), while maintaining other physical properties such as flexibility, durability, solvent and corrosive resistance, which comprises a reactable mixture of a carboxylic acid group-containing polyester, a monocarboxylic acid group-containing material and beta-hydroxyalkylamide curing agent.

3 Claims, No Drawings

MONOCARBOXYLIC ACID POWDER COATING CURING SYSTEMS

This is a divisional of patent application Ser. No. 07/706,816, filed on May 29, 1991, now the U.S. Pat. No. 5,266,657.

FIELD OF THE INVENTION

This invention relates to thermosetting powder coating compositions, and more particularly, to powder coating compositions having improved optical properties such as improved gloss reduced orange peel, and enhanced DOI (Distinctness of Image). Powder coatings of this invention are suitable for use in general industrial coatings, machinery and equipment coatings, especially metal coatings such as cans, appliances, automobile parts and the like. In addition, the powder coating compositions can be used in films, fibers, paints, lacquers, varnishes, seamless flooring, caulks and impregnants.

BACKGROUND OF THE INVENTION

It is known in the art that powder coating compositions are useful in painting metallic substrates. Such coating compositions are extremely desirable since their use greatly reduces and can even eliminate organic solvents in liquid paints. When powder coating compositions are cured by heating, little, if any, volatile material is given off to the surrounding environment. This is a significant advantage over liquid paints in which organic solvent is volatilized into the atmosphere when the paint is cured by heating.

For exterior durability, the powder coating composition of the prior art were formulated with a carboxylic acid group-containing polyester or acrylic polymer, a dicarboxylic acid group-containing material and beta-hydroxyalkylamide curing agent. These powder coating compositions and curing systems were said to be stable and possessed good physical properties. It is also equally well known in the art that the curing mechanism of the powder coating is an important aspect of powder coatings compositions. The curing system of this invention offers improved optical properties over prior art systems, while maintaining other desirable physical properties.

The curing mechanism of this invention is based on an acid group-containing polyester polymer, a beta-hydroxyalkylamide curing agent and a monocarboxylic acid group-containing material, which improves optical properties without adversely effecting other physical properties such as flexibility, durability, solvent and corrosive resistance.

SUMMARY OF THE INVENTION

In accordance with the present invention, a thermosetting powder coating composition is provided. The composition comprises a carboxylic acid group-containing polyester having a Tg of from about 30° C. to about 85° C. and an acid number of from about 20 to about 80, a beta-hydroxyalkylamide curing agent and a monocarboxylic acid for enhanced appearance and weathering properties.

The composition can also include an epoxy functional curing agent such as triglycidyl isocyanurate (TGIC) or mixtures of TGIC and a hydroxyalkylamide curing agent. The powder coating curing compositions of this invention have improved optical properties such as gloss, orange peel, and DOI (Distinctness of Image), while maintaining other physical properties such as storage stability (i.e., do not clump when exposed to heat), flexibility, hardness, solvent resistance and corrosion resistance, plus a good blend of other physical properties such as hardness, impact resistance and chemical resistance, and recoatability.

The composition can also include an acid functional acrylic polymer, an epoxy functional or hydroxyalkylamide curing agent, and a monofunctional carboxylic acid for enhanced appearance properties.

DETAILED DESCRIPTION OF THE INVENTION

The powder coating compositions of the present invention comprise an intimate mixture of several materials, however, there are three essential ingredients in the powder coating composition of this invention, namely, a carboxylic acid group-containing polyester, a second carboxylic group selected from the aliphatic or aromatic monocarboxylic acid group including mixtures thereof and a beta-hydroxyalkylamide curing agent. The addition of the monocarboxylic acid group significantly improves optical properties such as gloss, orange peel and DOI.

Among the carboxylic acid group-containing polyesters which may be used are those based on a condensation reaction of aliphatic polyols, including cycloaliphatic polyols, with aliphatic and/or aromatic polycarboxylic acids and anhydrides. Examples of suitable aliphatic polyols include 1,2-ethanediol, 1,3-propanediol, 1,4-butanediol, 1,6-hexanediol, neopentyl glycol, cyclohexane dimethanol, trimethylolpropane, and the like. Suitable polycarboxylic acids and anhydrides include succinic acid, adipic acid, azelaic acid, sebacic acid, terephthalic acid, isophthalic acid, tetrahydrophthalic acid, hexahydrophthalic acid, trimellitic acid, and anhydrides of such acids.

The polyol and the acid or anhydride are reacted together with an excess of acid over alcohol so as to form a polyester which has free carboxylic groups. Preferably, the carboxylic acid group-containing polyester will have an acid number of from about 20 to about 80, more preferably from about 20 to about 45, and will be solid at room temperature. The polyester is further characterized as having a Tg of from about 30° C. to about 85° C., preferably from about 40° C. to about 75° C..

The Tg of a polymer is a measure of the hardness and melt flow of the polymer. The higher the Tg, the less the melt flow and the harder the coating. Tg is described in *Principles of Polymer Chemistry* (1953), Cornell University Press. The Tg can be actually measured or it can be calculated as described by Fox in *Bull. Amer. Physics Soc.*, 1, 3, page 123 (1956). Tg, as used herein, refers to actually measured values. For measurement of the Tg of a polymer, differential scanning calorimetry (DSC) can be used (a rate of heating of 10° C. per minute, with Tg taken at the first influxation point).

If the Tg of the polyester is below 30° C., the polymer and a powder coating composition including such a polymer can tend to be sticky and difficult to handle. If the Tg is above 85° C., the melt flow of the polyester is low and the coating may have poor appearance.

The other essential ingredient in the powder coating compositions of the present invention is a beta-hydroxyalkylamide. The beta-hydroxyalkylamide is a curing agent for the acid-functional polyester. The beta-hydroxyalkylamide can help provide a crosslinked polymer network which is hard, durable, corrosion-resistant and solvent-resistant. It is believed the beta-hydroxyalkylamides cure the coating through an esterification reaction with the carboxy-containing polyester to form multiple ester linkages. The hydroxyl functionality of the beta-hydroxyalkylamide should be on an average basis at least two, preferably greater than two (2), and more preferably from greater than two (2) up to four (4) in order to obtain optimum curing response.

In preparing the acid group-containing acrylic polymer, the various monomers are mixed together and are reacted by conventional free radical initiated polymerization processes. Among the free radical initiators which may be used are benzoyl peroxide, tertiarybutyl hydroperoxide, ditertiarybutyl peroxide, azobis(2-methylpropionitrile) and so forth. Chain transfer agents such as mercaptopropionic acid can also be used. The polymerization is preferably carried out in solution using a solvent in which the monomers are soluble such as toluene or xylene. At the completion of the polymerization, the reaction mixture is devolatized such as by placing it under vacuum to remove the organic solvent and recovering the polymer as a solid material. Alternately, the polymer can be precipitated and subsequently dried. Usually the devolatized polymer will contain less than 1 percent by weight of materials that volatize at the temperatures used for curing the coatings.

The acid group-containing polymer can also be an acrylic polymer prepared by emulsion polymerization, suspension polymerization, bulk polymerization or suitable combinations thereof as outlined in U.S. Pat. No. 4,727,111 and is, by this reference, incorporated herein. These techniques are well-known in the art.

The beta-hydroxyalkylamide materials can be depicted structurally as follows:

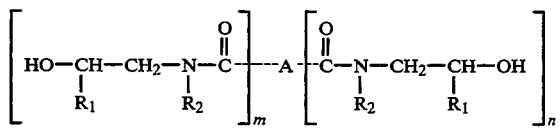

wherein $R_1$ is H or $C_1$-$C_5$ alkyl; $R_2$ is H, $C_1$-$C_5$ alkyl or

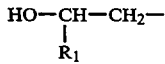

wherein $R_1$ is as described above; A is a bond, monovalent or polyvalent organic radical derived from a saturated, unsaturated or aromatic hydrocarbon including substituted hydrocarbon radicals containing from 2 to 20 carbon atoms, m is equal to 1 to 2, n is equal to 0 or 2, and m+n is at least 2, preferably greater than 2, usually within the range of from 2 up to and including 4. Preferably, A is an alkylene radical —($CH_2$) x— where x is from 2 to 12, preferably from 4 to 10.

The beta-hydroxyalkylamide can be prepared by reacting a lower alkyl ester or mixture of esters of carboxylic acids with a beta-hydroxyalkylamide at a temperature ranging from ambient temperature up to about 200° C. depending on the choice of reactants and the presence or absence of a catalyst. Suitable catalysts, include base catalysts such as sodium methoxide, potassium methoxide, sodium butoxide, potassium butoxide, sodium hydroxide, potassium hydroxide and the like, present in amounts of about 0.1 to about 1 percent by weight based on the weight of the alkyl ester.

To bring about the most effective cure of the powder coating composition, the equivalent ratio of beta-hydroxyalkylamide (hydroxy equivalents) to carboxy-containing polyester (carboxylic acid equivalents) is preferably from about 0.6 to 1.6:1, more preferably from 0.8 to 1.3:1. Ratios outside the range of 0.6 to 1.6:1 are undesirable because of poor cure.

The powder coating composition can also include a monocarboxylic acid group-containing material selected from aliphatic acids including stearic, myristic, palmitic, phenoxyacetic, phenoxypropionic, crotonic, benzylic and mandelic acids; aromatic acids include benzoic, toluic (ortho, meta and para), acetylsalicylic, salicylic, methoxybenzoic (anisic), isopropylbenzoic, and cinnamic; cycloaliphatic include cyclohexane carboxylic acid, cyclopentane carboxylic acid, and furoic acid; monoacid oligomers such as capped aliphatic dicarboxylic acid (e.g. adipio or sebacic monomethyl ester) or capped acid functional polyester; or oligomeric polyesters such as poly(caprolactone) or poly(caprolactam) and the like. Additionally, a monofunctional carboxylic acid in liquid form can be used. This monoacid material improves optical properties such as gloss, orange peel and DOI, and may provide for additional flexibility and/or impact resistance in the resultant coating as well.

The powder coating composition can further include a polycarboxylic acid group-containing material selected from the group of $C_4$-$C_{20}$ aliphatic polycarboxylic acids, polymeric polyanhydrides, low molecular weight polyesters having an acid equivalent weight from about 150 to about 600 and mixtures thereof.

Among the aliphatic polycarboxylic acids which may be used are included dicarboxylic acids such as adipic acid, suberic acid, azelaic acid, sebacic acid and dodecanedioic acid. Preferably, the aliphatic dicarboxylic acid contains an even number of carbons.

The coating composition may also contain certain other additives that are typically incorporated into powder coating compositions such as pigments, flow control agents, anti-popping agents, powder flow additives, and light stabilizers.

In order to give the powder coating compositions a suitable color, a pigment can be included in the coating composition typically in amounts from about 1 to about 50 percent by weight, based on the total weight of the powder coating composition. Pigments which are suitable for powder coating compositions may be organic or inorganic and include basic lead silica chromate, titanium dioxide, ultramarine blue, phthalocyanine blue, phthalocyanine green, carbon black, black iron oxide, chromium green oxide, ferrite yellow and quinto red.

Suitable as flow control agents are acrylic polymers or copolymers such as polylauryl acrylate, polybutyl acrylate, poly(2-ethylhexyl) acrylate, poly(ethyl acrylate-co-2-ethylhexyl acrylate), polylauryl methacrylate, polyisodecyl methacrylate and the like, and fluorinated polymers such as esters of polyethylene glycol or polypropylene glycol with fluorinated fatty acids, e.g., an ester of polyethylene glycol having a molecular weight over about 2,500 and perfluoro-octanoic acid. Polymeric siloxanes with molecular weights over 1,000 may also be used as a flow control agent, for example, polydimethylsiloxane or poly(methylphenyl) siloxane. The flow control agents can aid in reduction of surface tension during heating of the powder and in eliminating crater formation. Generally, the flow control agent, when used, is present in amounts from about 0.05 to about 5 percent by weight based on the total weight of the powder coating composition.

Anti-popping agents can be added to the compositions to allow any volatile material present to escape from the film during baking. Benzoin is a highly preferred degassing agent and when used is present in amounts ranging from about 0.5 to about 3 percent by weight based on total weight of the powder coating composition. The powder coating compositions may also preferably contain UV absorbing agents, such as TINUVIN®, which is commercially available and a registered trademark of Ciba-Geigy Company. When used, TINUVIN® are typically present in the compositions in amounts of about 0.5 to about 6 percent by weight based on the total weight of the powder coating composition.

In addition, the powder coating composition may contain fumed silica or the like as a powder flow additive to reduce caking of the powder during storage. An example of fumed silica is sold by Cabot Corporation under the trademark CAB-O-SIL®. The powder flow additive, when used, is generally present in amounts ranging from about 0.1 to about 0.5 percent by weight based on the total weight of the powder coating composition. The powder flow additive is generally added to the particulate powder coating composition after preparation of the particulate mixture.

The thermosetting powder coating compositions are prepared by melt blending the ingredients of the coating composition. This can be accomplished by first blending in a high shear or high-intensity dry mixer, e.g., a Henscheil mixer, and then melt blending the mixture in an extruder, for example, a Werner-Pfleiderer ZK-30 twin screw extruder at a temperature from about 80° C. to about 130° C. The extrudate is then cooled and pulverized into a powder. The powder coating composition can be applied directly to metal such as steel or aluminum, glass, plastic, or fiber-reinforced plastic substrates.

Application of the powder can be by electrostatic (corona discharge or triboelectric) spraying or by the use of a fluidized bed. Electrostatic spraying is preferred. The powder coating composition can be applied in one pass or in several passes to provide a film thickness after cure of about 0.5 to about 5 mils. Preferably, to provide a high-quality finish at reasonable cost, the thickness of the powder coating is from about 1.2 to about 4 mils, preferably from about 1.4 to about 3 mils.

The substrate to be coated can optionally be preheated prior to application of the powder to promote a more uniform powder deposition. Upon application of the powder, the powder-coated substrate can be baked typically at from about 300° F. to about 400° F. (149° C. to 204° C.) for about 5 to about 60 minutes, preferably about 20 to about 40 minutes.

The following examples show the preparation of various hydroxyalkylamide curing agents, carboxylic acid-functional polyester polymers, carboxylic acid-functional acrylic polymers, treated with monocarboxylic acids which are used in preparing thermosetting powder coating compositions of this invention.

These examples are intended to be illustrative of this invention but do not in any way limit its scope or interpretation which is more clearly defined in the claims.

Example 1

Preparation of Powder Coating (White Pigmented)

A pigmented powder coating composition containing a beta-hydroxyalkylamide crosslinker, a carboxylic acid containing polyester and various levels of a monofunctional carboxylic acid. For comparison, a similar system without the monofunctional carboxylic acid is given. All values are percents of the total formulation.

|  | Sample | | | | | |
| --- | --- | --- | --- | --- | --- | --- |
| Ingredient | A | B | C | D | E | F |
| Carboxylic acid group-containing polyester[1] | 55.81 | 55.94 | 54.95 | 53.48 | 52.04 | 49.90 |
| Hydroxylalkylamide | 2.94 | 3.03 | 3.20 | 3.42 | 3.59 | 3.86 |
| Modaflow III[2] | 0.75 | 0.75 | 0.75 | 0.75 | 0.75 | 0.75 |
| Stearic Acid | — | 0.28 | 1.10 | 2.15 | 3.12 | 4.99 |
| Benzoin | 0.50 | 0.50 | 0.50 | 0.50 | 0.50 | 0.50 |
| Titanium Dioxide | 40.00 | 39.49 | 39.50 | 39.50 | 40.00 | 40.00 |

Notes:
[1] A polyester having an acid number of ca. 34 available as Grilesta V76-12 from EMS-American Grilon, Inc.
[2] Modaflow III is an acrylic copolymer on a silica support and is available from the Monsanto Company.

The formulation ingredients were premixed in a Henschel high-intensity mixer at 1800 rpm for 1 minute followed by extrusion in a Werner and Pfleiderer ZSK-30 extruder at 110° C. The extrudates were then cooled, crushed, milled in a Micropul hammermill, sieved through a 140 mesh screen, and electrostatically sprayed onto Bonderite 1000 substrates with a Volstatic gun. Curing of the powder coatings was carried out in a forced-air oven at 180° C. for 20 minutes. The mechanical and optical properties of these coatings are given in Table 1 below.

TABLE 1

| Sample | % Acid[1] | Gloss 20/60 | DOI[2] | Orange Peel[3] | Impact Rev/Dir | T-bends | Pencil |
| --- | --- | --- | --- | --- | --- | --- | --- |
| A | 0 | 75/90 | 40 | 4 | >160/>160 | T-0 | H |
| B | 0.5 | 80/93 | 40 | 4–5 | >160/>160 | T-0 | H |
| C | 2 | 80/94 | 45 | 6 | >160/>160 | T-0 | H |
| D | 4 | 82/96 | 60 | 6 | >160/>160 | T-0 | H |
| E | 6 | 88/98 | 65 | 7 | >160/>160 | T-0 | H |
| F | 10 | 84/100 | 70 | 8–9 | >160/>160 | T-0 | H |

Notes:
[1] Percent acid is based on polyester resin.
[2] DOI scale is 0–100 with 100 = best
[3] Orange peel scale is 0–10 with 10 = best Example 2

Preparation of Powder Coating (White Pigmented)

A pigmented powder coating composition containing triglycidylisocyanurate crosslinker, a carboxylic acid containing polyester and various levels of a monofunctional carboxylic acid. For comparison, a similar system without the monofunctional carboxylic acid is given. All values are percents of the total formulation.

| Ingredient | Sample A | Sample B | Sample C |
|---|---|---|---|
| Carboxylic acid group-containing polyester[1] | 55.8 | 53.93 | 52.61 |
| Triglycidylisocyanurate[2] | 4.20 | 4.24 | 4.55 |
| Modaflow III[3] | 0.75 | 0.75 | 0.75 |
| Stearic Acid | — | 1.08 | 2.10 |
| Benzoin | 0.50 | 0.50 | 0.50 |
| Titanium Dioxide | 40.00 | 39.50 | 39.49 |

Notes:
[1] A polyester having an acid number of ca. 34 available as Grilesta P7307.3 from EMS-American Grilon, Inc.
[2] Available from Ciba-Geigy Corp. as Araldite PT-810.
[3] Modaflow III is an acrylic copolymer on a silica support and is available from the Monsanto Company.

The formulation ingredients were premixed in a Henschel high-intensity mixer at 1800 rpm for 1 minute followed by extrusion in a Werner and Pfleiderer ZSK-30 extruder at 110° C. The extrudates were then cooled, crushed, milled in a Micropul hammermill, sieved through a 140 mesh screen, and electrostatically sprayed onto Bonderite 1000 substrates with a Volstatic gun. Curing of the powder coatings was carried out in a forced-air oven at 180° C. for 20 minutes. The mechanical and optical properties of these coatings are given in Table 2 below.

TABLE 2

| Sample | % Acid[1] | Gloss 20/60 | DOI[2] | Orange Peel[3] | Impact Rev/Dir | T-bends | Pencil |
|---|---|---|---|---|---|---|---|
| A | 0 | 75/91 | 40 | 4 | >160/>160 | T-O | H |
| B | 2 | 82/93 | 60 | 4–5 | >160/>160 | T-O | H |
| C | 4 | 83/97 | 60–70 | 7 | >160/>160 | T-O | H |

[1] Percent acid is based on polyester resin.
[2] DOI scale is 0–100 with 100 = best
[3] Orange peel scale is 0–10 with 10 = best Example 3

Preparation of Powder Coating (Blue Pigmented)

A pigmented powder coating composition containing a beta-hydroxyalkylamide crosslinker, a carboxylic acid containing polyester and a monofunctional carboxylic acid. For comparison, a similar system without the monofunctional carboxylic acid is given. All values are percents of the total formulation.

| Ingredient | Sample A | Sample B |
|---|---|---|
| Carboxylic acid group-containing polyester[1] | 85.6 | 82.65 |
| Triglycidylisocyanurate[2] | 4.7 | 5.17 |
| Modaflow III[3] | 1.0 | 1.0 |
| Stearic Acid | — | 2.48 |
| Benzoin | 0.7 | 0.7 |
| Titanium Dioxide | 5.69 | 5.69 |
| BT-417[3] | 2.31 | 2.31 |

Notes:
[1] A polyester having an acid number of ca. 34 available as Grilesta V76-12 from EMS-American Grilon, Inc.
[2] Modaflow III is an acrylic copolymer on a silica support and is available from the Monsanto Company.
[3] BT-417 is phthalocyanine blue pigment previously available from DuPont.

The formulation ingredients were premixed in a Henschel high-intensity mixer at 1800 rpm for 1 minute followed by extrusion in a Werner and Pfleiderer ZSK-30 extruder at 110° C. The extrudates were then cooled, crushed, milled in a Micropul hammermill, sieved through a 140 mesh screen, and electrostatically sprayed onto Bonderite 1000 substrates with a Volstatic gun. Curing of the powder coatings was carried out in a forced-air oven at 180° C. for 20 minutes. The mechanical and optical properties of these coatings are given in Table 3 below.

TABLE 3

| Sample | % Acid[1] | Gloss 20/60 | DOI[2] | Orange Peel[3] | Impact Rev/Dir |
|---|---|---|---|---|---|
| A | 0 | 91/98 | 50 | 7 | >160/>160 |
| B | 3 | 98/99 | 60 | 7–8 | >160/>160 |

Notes:
[1] Percent acid is based on polyester resin.
[2] DOI scale is 0–100 with 100 = best
[3] Orange peel scale is 0–10 with 10 = best Example 4

Preparation of Powder Coating (White Pigmented)

A pigmented powder coating composition containing a beta-hydroxyalkylamide crosslinker, a carboxylic acid containing polyester and various levels of benzoic acid as the monofunctional acid additive. For comparison, a similar system without the monofunctional carboxylic acid is given. All values are percents of the total formulation.

| Ingredient | Sample A | Sample B | Sample C | Sample D |
|---|---|---|---|---|
| Carboxylic acid group-containing polyester[1] | 56.28 | 55.84 | 54.56 | 52.87 |
| Hydroxylalkylamide | 2.97 | 3.13 | 3.60 | 4.20 |
| Modaflow III[2] | 0.75 | 0.75 | 0.75 | 0.75 |
| Benzoic Acid | — | 0.28 | 1.09 | 2.18 |
| Benzoin | 0.50 | 0.50 | 0.50 | 0.50 |
| Titanium Dioxide | 39.5 | 39.5 | 39.5 | 39.5 |

Notes:
[1] A polyester having an acid number of ca. 34 available as Grilesta V76-12 from EMS-American Grilon, Inc.
[2] Modaflow III is an acrylic copolymer on a silica support and is available from the Monsanto Company.

The formulation ingredients were premixed in a Henschel high-intensity mixer at 1800 rpm for 1 minute followed by extrusion in a Werner and Pfleiderer ZSK-30 extruder at 110° C. The extrudates were then cooled, crushed, milled in a Micropul hammermill, sieved through a 140 mesh screen, and electrostatically sprayed onto Bonderite 1000 substrates with a Volstatic gun. Curing of the powder coatings was carried out in a forced-air oven at 180° C. for 20 minutes. The mechanical and optical properties of these coatings are given in Table 4 below.

TABLE 4

| Sample | % Acid[1] | Gloss 20/60 | DOI[2] | Orange Peel[3] | Impact Rev/Dir | T-bends | Pencil |
|---|---|---|---|---|---|---|---|
| A | 0 | 75/92 | 40 | 4 | >160/>160 | T-O | H |
| B | 0.5 | 74/92 | 35 | 5–6 | >160/>160 | T-O | H |

TABLE 4-continued

| Sample | % Acid[1] | Gloss 20/60 | DOI[2] | Orange Peel[3] | Impact Rev/Dir | T-bends | Pencil |
|---|---|---|---|---|---|---|---|
| C | 2 | 87/91 | 55 | 5 | >160/>160 | T-O | H |
| D | 4 | 87/93 | 50 | 6 | >160/>160 | T-O | H |

Notes:
[1]·Percent acid is based on polyester resin.
[2]·DOI scale is 0–100 with 100 = best
[3]·Orange peel scale is 0–10 with 10 = best

Example 5

Preparation Of Acrylic Powder Coating

A pigmented powder coating composition containing a beta-hydroxyalkylamide crosslinker, a carboxylic acid containing acrylic polymer and 4% (based on acrylic resin) of stearic acid as the monofunctional acid additive. For comparison, a similar system without the monofunctional carboxylic acid is given. All values are percents of the total formulation.

| Ingredient | Sample A | Sample B |
|---|---|---|
| Carboxylic acid group-containing acrylic[1] | 56.42 | 53.45 |
| Hydroxylalkylamide | 3.22 | 3.64 |
| Modaflow III[2] | — | 0.76 |
| Resiflow P-67[3] | 0.60 | — |
| Stearic Acid | — | 2.14 |
| Benzoin | — | 0.49 |
| Titanium Dioxide | 39.76 | 39.50 |

Notes:
[1]·An acrylic resin available as SCX-815B from S.C. Johnson Co.
[2]·Modaflow III is an acrylic copolymer on a silica support and is available from the Monsanto Company.
[3]·Resiflow P-67 is an acrylic flow aid available from Estron Chemical.

The formulation ingredients were premixed in a Henschel high-intensity mixer at 1800 rpm for 1 minute followed by extrusion in a Werner and Pfleiderer ZSK-30 extruder at 110° C. The extrudates were then cooled, crushed, milled in a Micropul hammermill, sieved through a 140 mesh screen, and electrostatically sprayed onto Bonderite 1000 substrates with a Volstatic gun. Curing of the powder coatings was carried out in a forced-air oven at 180° C. for 30 minutes. The mechanical and optical properties of these coatings are given in Table 5 below.

TABLE 5

| Sample | % Acid[1] | Gloss 20/60 | DOI[2] |
|---|---|---|---|
| A | 0 | 63/85 | 40 |
| B | 4 | 92/>110 | 30 |

Notes:
[1]·Percent acid is based on acrylic resin.
[2]·DOI scale is 0–100 with 100 = best

Example 6

QUV-8 Weathering Resistance

Bonderite 1000 panels, coated with the powder coating compositions of Example 3, were placed in a QUV Weatherometer equipped with a "B"-bulb (313 nm radiation maximum). The weatherometer cycle was 8 hours of light at 65° C., 4 hours condensation at 40° C. Panels were always inserted and read for 20 and 60° gloss during the light cycle. Gloss retention, measured as the time (in hours) for a given gloss level, was calculated from the gloss measurements as a function of time. These data are given in Table 6.

TABLE 6

| Sample | % Retention at 306 hours | Hrs to 60% retention | Hours to 50% gloss | % Retention at 306 hours | Hours to 80% retn. | Hrs to 70% gloss |
|---|---|---|---|---|---|---|
| A | 30 | 245 | 257 | 66 | 272 | 290 |
| B | 47 | 274 | 295 | 73 | 285 | 312 |

TEST PROCEDURES (1) The impact strength was measured with a Gardner Impact Tester. The coated panels were subjected to increasing amounts of impact until the coating cracked: the panel was impacted on the coating side, i.e., direct impact, and also on the side of the side of the coating panel opposite the coating, i.e., reverse impact. The results are reported in inch-pounds.

(2) The T-bend test involved bending coated panels (1½"×12") 180° so that the coated panel folded over itself and checking for cracking delamination along the bend.

(3) Pencil hardness was determined by taking pencils of increasing hardness (from F to 3 H), and attempting to etch a scribe mark in the coating. The hardness of the first pencil that would etch the coating is reported as the pencil hardness of the film.

(4) The 20° and 60° gloss were measured with gloss meters manufactured by the Gardner Instrument Company.

(5) Orange Peel was judged visually on the cure panels and was ranked according to the degree of surface roughness present.

(6) Distinctness of Image was measured using an apparatus which reflects semicircular images or varying size on a panel's surface. The size of the images clearly visible on the panel determines the DOI value cited.

Although the present invention has been described with specific reference to specific details outlined in the above examples, it is not intended that such details should be regarded as limitations upon the scope of the invention except to the extent that such limitations are included in the accompanying claims.

We claim:

1. A thermosetting powder coating composition having improved appearance properties comprising a carboxylic acid group-containing acrylic resin, a beta-hydroxyalkylamide curing agent, and from about 0.5 to about 15 weight percent based on the weight of the acrylic resin of a monocarboxylic acid group containing material having one carboxylic acid functional group.

2. The composition of claim 1 wherein the monocarboxylic acid comprises from about 1 to about 10 percent by weight based on the weight of the acrylic resin.

3. A thermosetting powder coating composition having improved appearance properties comprising a carboxylic acid group-containing polyester, an epoxy functional crosslinking curing agent, and from about 1 to about 10 weight percent based on the weight of the polyester of a monocarboxylic acid group-containing material having one carboxylic acid functional group.

* * * * *